United States Patent
Ourednik et al.

(10) Patent No.: US 11,031,672 B2
(45) Date of Patent: Jun. 8, 2021

(54) ANTENNA AND SYSTEM FOR RF COMMUNICATIONS

(71) Applicants: STMicroelectronics Design and Application S.R.O., Prague (CZ); STMicroelectronics Application GmbH, Aschheim-Dornach (DE)

(72) Inventors: Petr Ourednik, Prague (CZ); Yvon Gourdou, Munich (DE)

(73) Assignees: STMicroelectronics Design and Application S.R.O., Prague (CZ); STMicroelectronics Application GmbH, Aschheim-Dornach (DE)

(*) Notice: Subject to any disclaimer, the term of this patent is extended or adjusted under 35 U.S.C. 154(b) by 18 days.

(21) Appl. No.: 16/521,757

(22) Filed: Jul. 25, 2019

(65) Prior Publication Data

US 2020/0036080 A1    Jan. 30, 2020

(30) Foreign Application Priority Data

Jul. 27, 2018 (EP) .................................... 18186154

(51) Int. Cl.
*H01Q 1/22* (2006.01)
*H01Q 1/38* (2006.01)
*H01Q 7/00* (2006.01)

(52) U.S. Cl.
CPC ............. *H01Q 1/2216* (2013.01); *H01Q 1/38* (2013.01); *H01Q 7/00* (2013.01)

(58) Field of Classification Search
None
See application file for complete search history.

(56) References Cited

U.S. PATENT DOCUMENTS

| 6,069,564 | A | * | 5/2000 | Hatano | G06K 7/10346 340/572.7 |
| 2005/0242959 | A1 | * | 11/2005 | Watanabe | H01Q 7/00 340/572.7 |
| 2014/0184462 | A1 | | 7/2014 | Yosui | |
| 2015/0097741 | A1 | | 4/2015 | Pachler et al. | |
| 2015/0188227 | A1 | | 7/2015 | Schaefer et al. | |
| 2016/0345627 | A1 | * | 12/2016 | Liu | G06K 19/0723 |

FOREIGN PATENT DOCUMENTS

| EP | 1031940 A1 | 8/2000 |
| JP | 2001101371 A | 4/2001 |
| WO | 2006053692 A1 | 5/2006 |
| WO | 2012009776 A1 | 1/2012 |

OTHER PUBLICATIONS

First Office Action from co-pending EP Appl. No. 18186154.3 dated May 26, 2020 (4 pages).

* cited by examiner

*Primary Examiner* — Anh Q Tran
(74) *Attorney, Agent, or Firm* — Crowe & Dunlevy (57) ABSTRACT

An antenna includes two planar coils that are mechanically disposed face to face and electrically connected in series. The antenna is mounted to a disposable consumer product (for example, a cartridge for use with an electronic cigarette). The antenna is configured to support near field communications with a reader circuit for purposes of authenticating use of the disposable consumer product.

26 Claims, 5 Drawing Sheets

ANTENNA AND SYSTEM FOR RF COMMUNICATIONS

PRIORITY CLAIM

This application claims the priority benefit of European Application for Patent No. 18186154.3, filed on Jul. 27, 2018, the content of which is hereby incorporated by reference in its entirety to the maximum extent allowable by law.

TECHNICAL FIELD

The present disclosure relates generally to electronic circuits and more particularly to a wireless communication system using RFID (Radio Frequency Identification) technology, Near Field Communication (NFC) technology or the like. The present disclosure more particularly applies to communications between two mechanically associated devices, and more particularly to an electronic cigarette device.

BACKGROUND

Communication systems with electromagnetic transponders are more and more frequent, particularly since the development of proximity or near field radiofrequency communication based on RFID or NFC technologies. Standards ISO-15693 and ISO-14443 disclose such kind of radiofrequency communications.

Such systems use the power generated by a radio frequency field of a terminal to communicate with, and most often to power, an electromagnetic transponder.

NFC devices and NFC communications are used for exchanging information between two devices, generally named reader and tag. The reader generates, via an antenna, an electromagnetic field. The tag also comprises an antenna, which is excited when in close coupling with the antenna of the reader.

In some cases, the communication between a reader and a tag is polluted or perturbed by the environment of the antenna and more particularly by the mechanical surrounding of the antennas of the reader and of the tag.

SUMMARY

There is a need for improving the antennas for RF communications.

One embodiment addresses all or some of the drawbacks of known NFC systems.

One embodiment provides an antenna comprising two planar coils mechanically disposed face to face and electrically connected in series.

According to an embodiment, the antenna is sized for a near field radiofrequency communications, such as RFID communications, or communication disclosed in NFC Forum or in standards ISO15693 and ISO-14443.

According to an embodiment, the coils are coaxial.

According to an embodiment, the distance separating the coils is chosen to allow field lines to be propagated, between the two coils, in a direction parallel to the surface of the coils.

According to an embodiment, the coils are made of windings of conductive tracks.

According to an embodiment, the internal ends of the coils are electrically coupled, preferably connected, and wherein the external ends of the coils are electrically coupled, preferably connected.

According to an embodiment, one of the coils is interrupted in its internal winding to define two terminals of the antenna.

According to an embodiment, the electrical connection of the coils is such that, when a current circulates from the center to the periphery of one coil, it circulates from the periphery to the center of the other coil.

One embodiment provides a system of wireless communication, comprising: a tag having a first antenna; and a reader having a second antenna.

According to an embodiment, the coupling distance between the reader and the tag is constant, preferably mechanically fixed.

According to an embodiment, the second antenna is a planar coil.

According to an embodiment, the second antenna is a planar coil having a central axis perpendicular to the central axis of the coils of the first antenna.

According to an embodiment, the second antenna has a central axis parallel, but not coaxial, to the central axis of the coils of the second antenna.

According to an embodiment, each coil of the first antenna is coplanar to a sheet of ferrite.

According to an embodiment, the system is for authenticating a product by an apparatus, the reader being carried by the apparatus and the tag being carried by the product.

According to an embodiment, the product is mechanically linked to the apparatus.

One embodiment provides an electronic cigarette comprising a system of wireless communication.

According to an embodiment, the product is a cartridge of the electronic cigarette.

One embodiment provides a cartridge for an electronic cigarette comprising an antenna.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the communication protocols between a reader and a tag are not described in detail, the described embodiments being compliant with usual NFC communication protocols. Furthermore, the constitution details and operation of an electronic cigarette are not described in detail, the described embodiments being compliant with usual electronic cigarettes.

Unless indicated otherwise, when reference is made to two elements connected together, this signifies a direct connection without any intermediate elements other than conductors, and when reference is made to two elements linked or coupled together, this signifies that these two elements can be connected, or they can be linked or coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
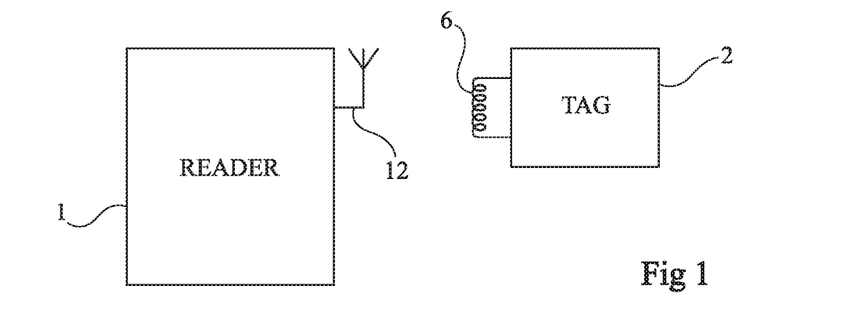
FIG. 1 is a simplified view, in the form of blocks, of an example of a contactless near field communication system (NFC)

FIG. 1 is a simplified view, in the form of blocks, of an example of a contactless near field communication system to which apply the disclosed embodiments. The system can be any RF communication system like those of standards ISO-155693, ISO-14443, NFC Forum, RFIC and like.

A terminal or reader 1 (READER) comprises various electronic circuits for generating a radio frequency signal transmitted by means of an antenna 12. The radio frequency field generated by terminal or reader 1 is detected by one or a plurality of electromagnetic transponders, for example, an electronic tag 2 (TAG) located in the range. Tag 2 itself comprises an antenna 6 and electronic circuits. Tag 2 generally extracts the power necessary for the operation of the circuits that it comprises from the radio frequency field generated by terminal 1. The respective antennas 12 and 6 of the terminal 1 and of the tag 2 are part of oscillating circuits also comprising capacitances. The oscillating circuits of the terminal 1 and of the tag 2 are preferably tuned at least approximately at the same frequency, preferably at the same frequency, for example 13.56 MHz.

When the reader 1 emits an electromagnetic field to initiate a communication with the tag 2, the field is captured by tag 2 as soon as it is within its range. The coupling between the two oscillating circuits (that of the antenna 6 and that of the antenna 12) results in a variation of the load formed by the circuits of tag 2 on the field generation oscillating circuit of reader 1. In practice, the corresponding phase or amplitude variation of the emitted field is detected by reader 1, which for example then starts a protocol of NFC communication with tag 2.

For a communication in the direction from terminal 1 to tag 2, terminal 1 modulates, for example in amplitude, the remote supply carrier (typically at 13.56 MHz). In the direction from tag 2 to terminal 1, the communication is performed by modification of the load (retromodulation) formed by the tag on the oscillating circuit of the terminal, for example, in amplitude modulation or in phase modulation.

Figure 2:
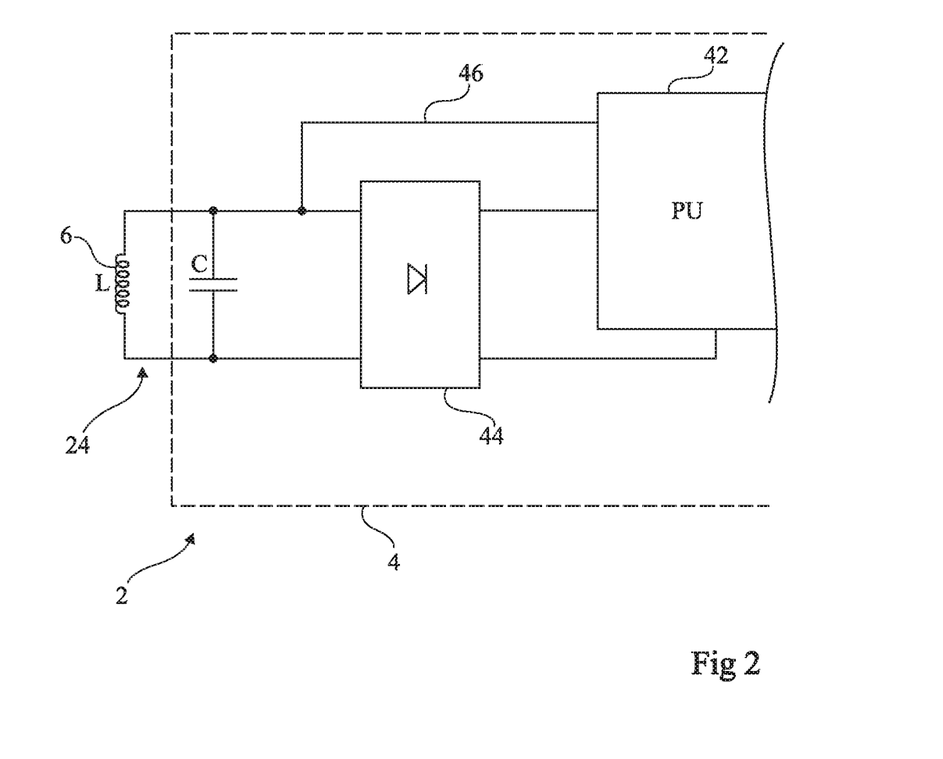
FIG. 2 is a block diagram partially illustrating an embodiment of circuits of a near field communication device.

FIG. 2 is a block diagram partially illustrating an embodiment of circuits of a near field communication device, like the tag 2 of FIG. 1.

In a simplified manner, tag 2 comprises at least one series or parallel resonant circuit 24. In the case of a parallel resonant circuit as represented, the circuit 24 comprises an inductor L forming antenna 6 in parallel with a capacitive element C. The resonant circuit 24 senses the radio frequency field of a terminal (1, FIG. 1). Resonant circuit 24 is coupled to an integrated circuit 4 comprising various electronic circuits among which, generally, includes a unit 42 (PU) for processing the signals received from the terminal and for generating the retromodulation signal. Integrated circuit 4 also generally comprises various circuits (for impedance matching, switching, coupling and other such circuits) not represented between resonant circuit 24 and processing unit 42. Capacitor C is, in this example, integrated in circuit 4.

In the represented embodiment, tag 2 draws its power from the electromagnetic field that it picks up. In this case, the tag furthermore includes a bridge rectifier 44, the input terminals of which are connected to the terminals of the resonant circuit, i.e. the terminals of the parallel association of inductor L and capacitor C, and the output terminals of which are coupled (possibly via a voltage regulator, not shown) to supply power to the circuit 42. Generally, in this case, a direct link 46 is also provided between resonant circuit 24 and processing unit 42 and, more particularly, its radiofrequency reception chain, to provide an RF signal unfiltered by the rectifier to the circuit 42.

In the applications to which more particularly apply the embodiments which are described, the reader and the tag are associated to two different physical devices, which need to communicate together.

The need for a wireless communication between these two devices may generate constraints on the antennas due to the shape and or to the size of each device.

The embodiments are described in relation with an example of application to an electronic cigarette and more particularly to a system for authenticating a cartridge of an electronic cigarette.

Figure 3A:
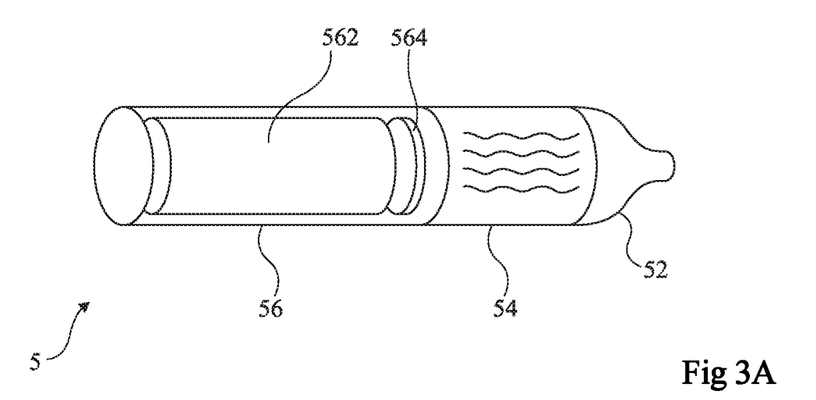
FIGS. 3A-3B show schematic views of an electronic cigarette.
Figure 3B:
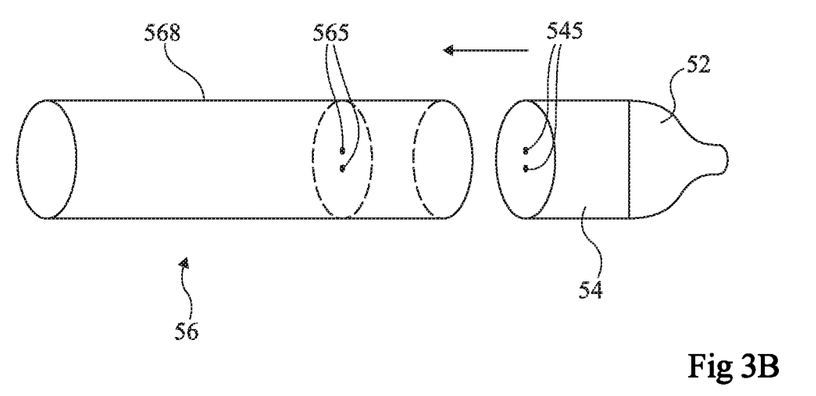

FIGS. 3A-3B represent, very schematically, an embodiment of an electronic cigarette 5.

FIG. 3A represents the electronic cigarette, mounted, i.e. ready for use. FIG. 3B illustrates the two parts of the electronic cigarette aimed to be respectively associated with a reader and with a tag of a RF communication system.

An electronic cigarette 5, or e-cigarette, mainly comprises at least a mouthpiece 52, a cartridge or tank 54 having a tubular shape and containing a liquid solution, and a body 56. Mouthpiece 52 and tank 54 can be a single piece element. Body 56 comprises amongst others a battery 562 and an electronic circuit 564 including a microprocessor and an NFC reader. An atomizer not shown is included in the body 56 or in the cartridge 54. The atomizer comprises a heating element that vaporizes the liquid and wicking material that draws liquid onto the heating element. The atomizer creates an aerosolized vapor, which a user inhales and that provides a flavor and feel like a cigarette. If the atomizer is included in the cartridge, cartridge 54 and body 56 comprise face to face electrical terminals 545 and 565 (FIG. 3B) to power the atomizer.

As shown in FIG. 3B, the body 56 comprises a housing 568 which defines a space for receiving the cartridge 54. The housing 568 is, for example, metallic and the walls of the cartridge are generally made of plastic.

The cartridge or tank 54 is changeable and can be considered as an accessory or a consumable of the electronic cigarette 5. It may be desirable to check the authenticity of the tank, i.e. that the tank has been produced by an authorized manufacturer.

More generally, the embodiments apply to the verification of the authenticity of a product (the cartridge) associated with an apparatus (the body of the electronic cigarette) by circuits respectively contained in the product and in the apparatus, using proximity radiofrequency communications (RFID, NFC, 15693, 14443, etc.) between the apparatus and the product.

The presence of not genuine products, consumables or accessories of an apparatus constitutes a problem for the manufacturer of the apparatus and for the authorized suppliers of the authentic products (consumables or accessories), especially, in situation where a customer returns the product to the manufacturer for functional problems, it is important to be able to distinguish authentic products from non-genuine products. For this, the associated apparatus and products are equipped with electronic circuits running authenticity verification protocols when setting up a new product, when the apparatus is switched on, periodically, during a need for replacement of the product, etc.

According to these embodiments, the authentication uses RF communication, for example, a Radio Frequency Identification (RFID). A reader (1, FIG. 1) is included or attached to the apparatus and a tag 2 is included or attached to the product. Tag 2 contains a unique identifier (ID) and one aim of the communication is to check this identifier, by the terminal, to authenticate the tag. The tag is preferably powered by extracting energy from the field generated by the terminal 1.

According to the embodiment to an electronic cigarette 5, the tag 2 is carried by (attached or integrated to) the cartridge 54 and the reader is carried by (attached or integrated to) the body 56.

Various constraints are due to the size and shape of the electronic cigarette, and more generally of products and apparatus carrying a tag or a reader and their antennas.

First, the space in the cartridge and in the cigarette is limited, which conditions the size of the antenna. In particular, the reduced size of the cartridge does not allow for the provision of a large antenna.

In some cases, like in the electronic cigarette taken as example, the metallic parts create shielding for the radiofrequency communication. Indeed, the electromagnetic field used for RF communications is influenced by any object whose electrical parameters differ from the electrical parameters of the media in which the field is propagating. For near field communications at high frequencies (typically from 3 MHz to 30 MHz), the electromagnetic field is usually mostly composed of a magnetic field, whose parameters are sensitive to the conductivity and permeability of the influencing bodies. Highly conducting bodies (composed, for example, from copper or aluminum) act as a shield for the field and therefore limit the communication. In the example of the electronic cigarette 5, the housing 568 is metallic and defines a cavity where the cartridge 54 is placed. Even though there is usually no conducting body in the direct path between the reader and the tag, the proximity of the metal of the housing is influencing (attenuating) the communication.

More generally, even if the constraint due to the metallic parts is lower, the space available for the antenna is directed by the product and is usually reduced with respect to the space ideally needed for an optimal communication.

Another difficulty is that the shape and dimensions of the electronic cigarette do not allow for the placement of the reader antenna and the tag antenna side by side.

Figure 4:
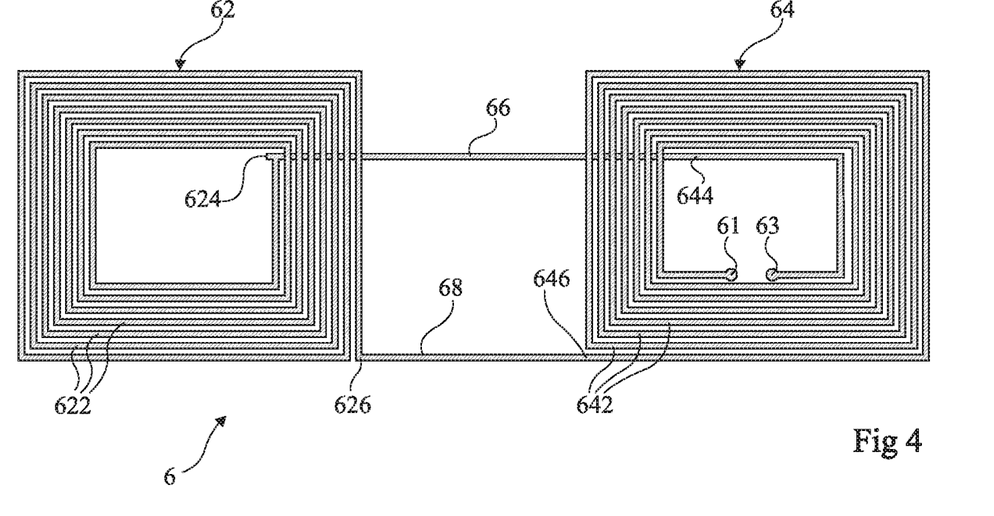
FIG. 4 illustrates an embodiment of an antenna before its mounting in a device.

FIG. 4 illustrates an embodiment of an antenna before its mounting in a device like the cartridge 54 of electronic cigarette 5 of FIG. 3.

Figure 5:
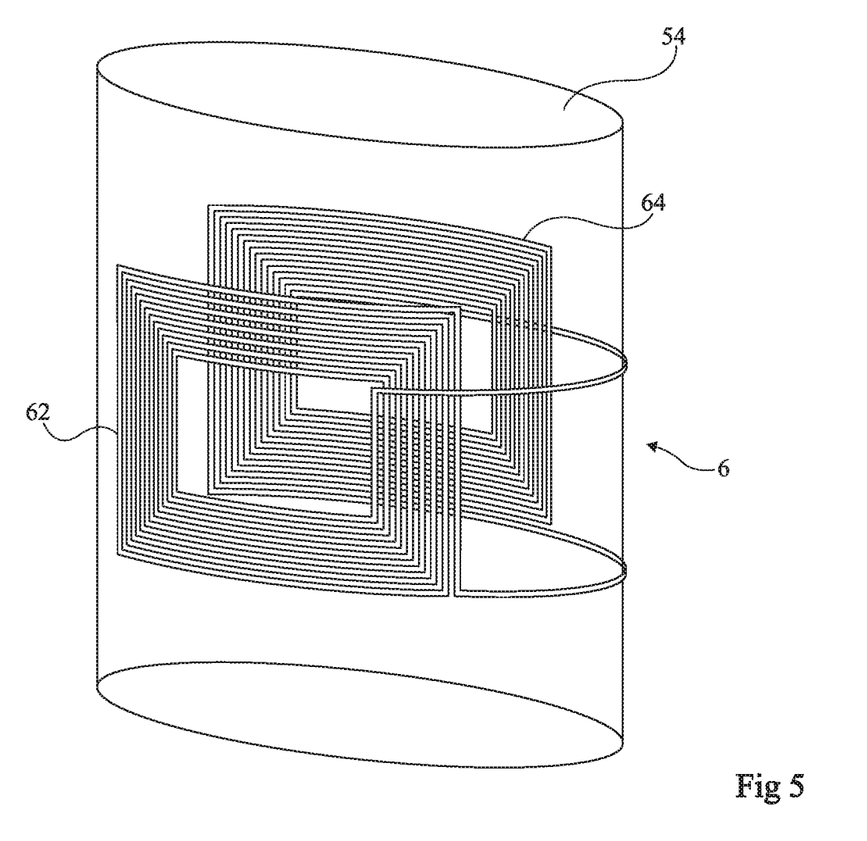
FIG. 5 illustrates the antenna of FIG. 4 mounted in a device.

FIG. 5 illustrates the antenna of FIG. 4 mounted in a device like the cartridge 54 electronic cigarette of FIG. 2.

An antenna 6 according to the embodiments, which are described, comprises two planar coils 62 and 64, mechanically disposed face to face and electrically connected in series.

Each coil 62, 64 is made of a plurality of windings 622 and 642 or turns of a conductive track. The antenna is preferably realized by the deposition of conductive tracks, preferably in aluminum, on a flexible substrate (not shown).

The number of turns depends on the inductance which is desired for the antenna and on the available space.

Coils 62 and 64 are electrically connected in series via two conductive tracks 66 and 68 respectively coupling internal ends 624 and 644 and external ends 626 and 646 of the coils. Terminals 61 and 63 of the antenna 6, to be connected to capacitor C (FIG. 2) and integrated circuit 4 are defined by an interruption of the continuity of the electrical circuit forming the antenna 6. In the example illustrated in FIG. 4, the terminals 61 and 63 are in the internal winding of coils 64. However, the terminals 61 and 63 can, more generally be provided at any position of the electrical path, for example, depending on the location of the integrated circuit 4 in the cartridge.

As can be seen in FIGS. 4 and 5, the electrical connection of the coils 62 and 64 is such that, when a current circulates from the center to the periphery of one coil, it circulates from the periphery to the center of the other coil.

Capacitor C can be a specific component or be formed by the parasitic or intrinsic capacitance of the antenna. According to a preferred embodiment represented in FIG. 2, capacitor C is provided by the chip 4 itself.

The shape of the windings of coils 62 and 64 can be square, rectangular, circular, etc., depending of the application and of geometrical constraints imposed by the device to which the antenna 6 is associated.

The mounting of an antenna 6 of the type illustrated by FIGS. 4 and 5 comprises the step of bending the antenna to bring the coils 62 and 64 is a face to face disposition. The length of tracks 66 and 68 is function of the geometry of the device. Therefore, once mounted, the antenna 6 is composed of two inductors 62 and 64 connected in a way where the currents flowing through the coils are coherent, so they sum up.

In the example of FIG. 5, the coils 62 and 64 are mounted to an outer surface of the tubular shaped cartridge 54, which has, for example, an ovoid cross-section, in a placement on two opposite sides of the tubular shaped cartridge 54. Coils 62 and 64 are then face to face and separated by the tank containing the liquid.

Figure 8:
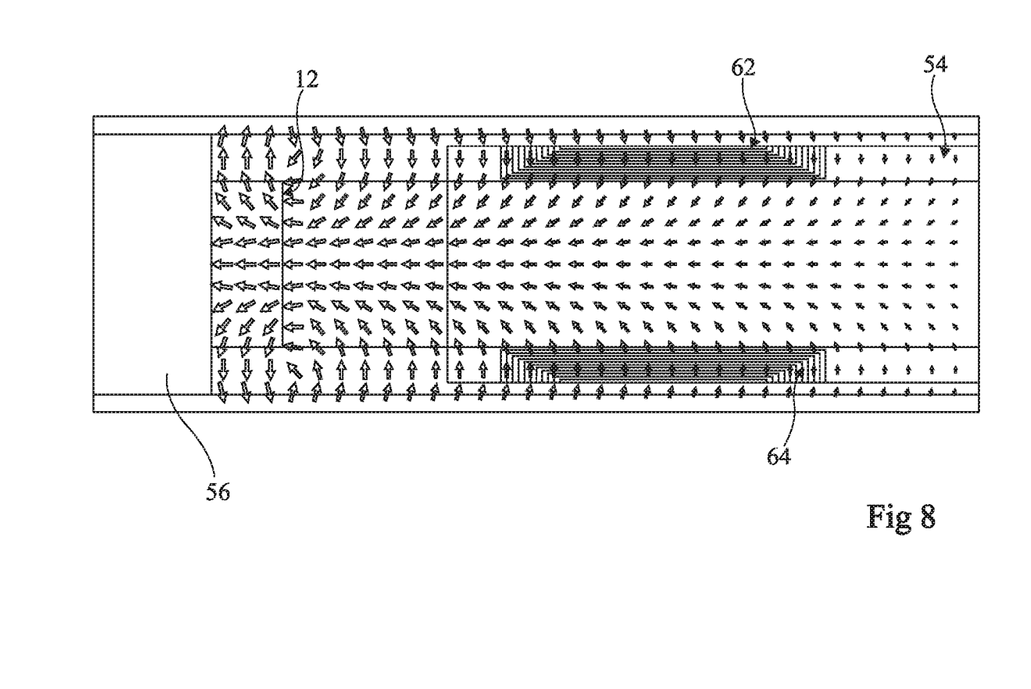
FIG. 8 illustrates the field lines of an embodiment of a wireless communication system.

More generally and this will be better understood in relation with FIG. 8, the distance separating the coils is preferably chosen to allow field lines to be propagated, between the two coils 62 and 64, in a direction parallel to the surface of the coils. Furthermore, coils 62 and 64 are preferably coaxial.

Antenna 6 is preferably flexible to allow it to fit with the device to which it is associated.

Figure 6:
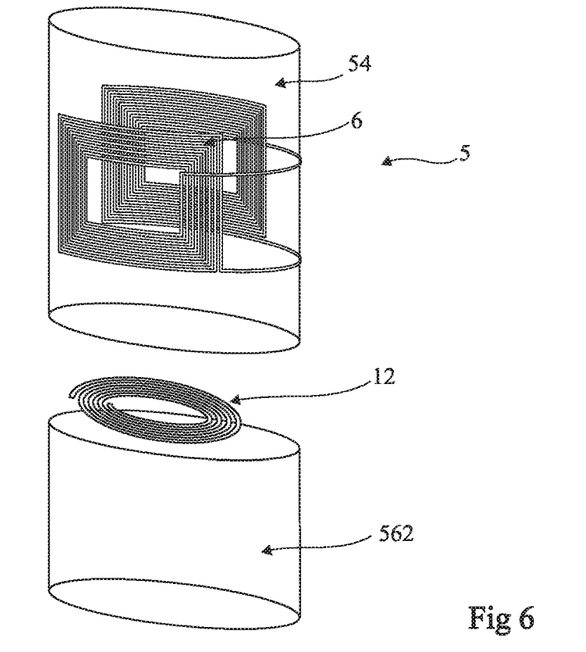
FIG. 6 is a perspective, partial and schematic view of a wireless communication system for an electronic cigarette.

FIG. 6 is a perspective, partial and schematic view of the locations of antennas 12 and 6 of a wireless communication system for an electronic cigarette.

Figure 7:
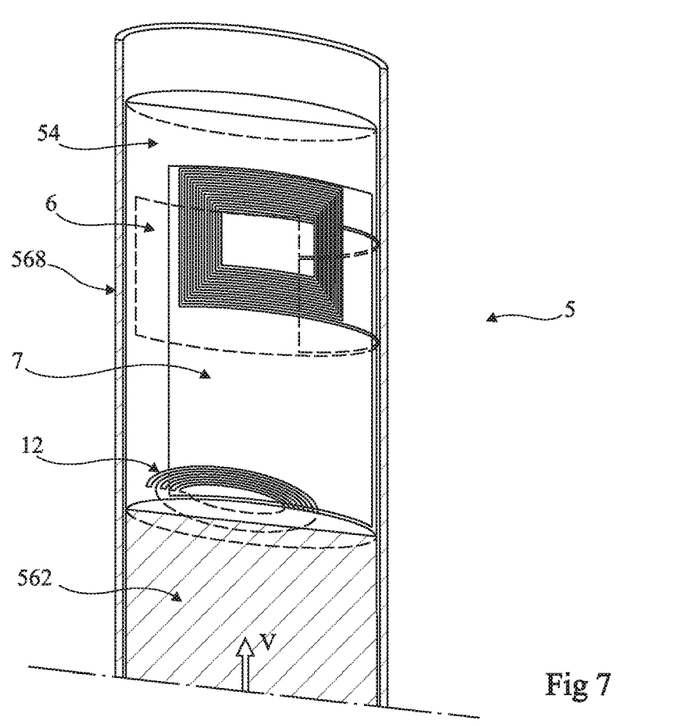
FIG. 7 is a longitudinal section of the system of FIG. 6.

FIG. 7 is a longitudinal section of the system of FIG. 5.

In the embodiment which is represented, the antenna 12 of the reader is carried by the body 56 of the electronic cigarette. More particularly, antenna 12 has the form of a planar coil placed at the top of body 56 (above the battery 562), perpendicularly to the longitudinal axis (v).

Thanks to the fact that the mechanical relation between the body 56 and the cartridge 54 is fixed (the cartridge is removable from the body 56 but has always the same position with respect to the body 56, when mounted on it), the coupling distance between antennas 12 and 6 is constant. This facilitates the sizing of both elements.

In the preferred embodiment represented, antenna 12 has its central axis perpendicular to the central axis of the coils of antenna 6. In other words, antenna 12 is coaxial with the body 56 (axis v) and the axis of antenna 6 (common axis of coils 62 and 66) if perpendicular to the longitudinal axis v of the electronic cigarette 5.

As alternative embodiments, the antenna 12 of the body 56 can have a different shape than represented. For example, antenna 12, can be non-planar, can be made of windings having a central axis parallel, but not coaxial to the central axis of the coils 62 and 64, can be made of a similar antenna as antenna 6, can be formed of planar flexible antenna to be parallel to the housing of the body 56, etc.

To improve the coupling between antenna 12 and 6, ferrite sheets 7 can be associated to the coils 62 and 64. More particularly, when the structure and walls of the housing around the cartridge is made of metal, the use of ferrite between the metal parts and the coils improves the coupling. Ferrite sheets 7 on the inner walls of the housing 568 provide shielding effect of the metallic walls. Each ferrite sheets have high permeability and guide the field lines. Ferrite sheets 7 can be made of a sticker on which is deposited as layer of ferrite material with high permeability.

In the embodiment where the cartridge 54 is introduced in the housing 568 of the body 56 of the electronic cigarette, ferrite sheets 7 are preferably provided in the housing, which means that the sheets 7 are associated to the apparatus and not to the consumables, and therefore the cost impact on the system is reduced. As an alternative, the ferrite sheets can, however, be carried by the cartridge.

In the embodiment shown in FIG. 7, sheets 7 of ferrite are interposed between the housing around the cartridge 542 and the coils 62 and 64. Coils 62 and 64 of antenna 6 are then, in operation, coplanar to one or several sheets of ferrite.

The ferrite sheet(s) can line the totality of the internal side of the housing 568 around cartridge 542, but for cost saving, are preferably only provided to screen coils 62 and 64 and extend vertically down to the antenna 12

The shape of the antenna 6 increases the inductance of both antenna 6 and mutual inductance between antenna 12 and 6, and therefore the reading range.

FIG. 8 schematically illustrates the field lines in the arrangement of FIGS. 6 and 7.

As it can be seen, thanks to the space between coils 62 and 64 and to the disposition of coils 12, the field lines propagate parallel to the longitudinal axis of the electronic cigarette between the two coils 62 and 64 and axially within the respective coils. Therefore, the intensity of the field captured by the antenna 6 can be considered as doubled with respect to a single coil.

The proposed arrangement increases the inductance of the tag that is usually difficult to achieve in this technology, especially with the proximity of the metallic housing.

An advantage of the embodiments, which have been described, is that they are compatible with cost constraints that are particularly present for disposables like cartridges for electronic cigarettes, keeping the cost at an acceptable level for an industrialization compatible with the market. For example, antenna 6 can be made of aluminum and in standard pitch and low side. Indeed, in the RFID tag manufacturing, the cost is generally lower when the dimension of the tag is around 30×15 mm and then increases when the size is lower (for example 10×10 mm) or higher (for example, 50×30 mm). In the first case, this is due to the usage of more expensive technology to reach small pitch (for example, replacement of aluminum by copper or using aluminum edge technology with smaller pitch and double side antenna).

Another advantage is that the described embodiments take advantage of the shape and geometric properties of the product. Indeed, the small size accessories or consumables which are inducing the constraint of a small tag have the advantage to allow the bending of the antenna around the product.

Another advantage is that the operation of the antenna is not impacted by the position (axial rotation of 180°) of the cartridge. This provides comfort to the user who is free to choose the orientation of the cartridge.

Various embodiments and variants have been described. Those skilled in the art will understand that certain features of these embodiments can be combined, and other variants will readily occur to those skilled in the art. In particular, the system which has been described can be applied to other associations of apparatus-product different than an electronic cigarette in which similar problems are present, for example a printer and its cartridges. Furthermore, the specific design of the antenna with two coils face to face and electrically in series can more generally be used in any proximity radiofrequency communication system based on standards ISO-15693 and ISO-14443 or on RFID technology or NFC Forum.

Finally, the practical implementation of the embodiments and variants described herein is within the capabilities of those skilled in the art based on the functional description provided hereinabove. In particular, the sizing of the antennas and their shape depend of the application and of the shape of the devices to which they are associated.

The invention claimed is:

1. A system of wireless communication, comprising:
   a tag having a first antenna comprising:
      a first planar coil;
      a second planar coil;
      wherein the first and second planar coils are electrically connected in series; and
      a mechanical support for the first and second planar coils that disposes the first and second planar coils in a face to face relationship; and
   a reader having a second antenna; and
   wherein each coil of the first and second planar coils of the first antenna is coplanar to a sheet of ferrite.

2. The system according to claim 1, wherein a coupling distance between the reader and the tag is constant.

3. The system according to claim 1, wherein a coupling distance between the reader and the tag is mechanically fixed.

4. The system according to claim 1, wherein the second antenna is a planar coil.

5. The system according to claim 1, wherein the second antenna is a planar coil having a central axis perpendicular to a central axis of the first and second planar coils of the first antenna.

6. The system according to claim 1, wherein the second antenna has a central axis parallel, but not coaxial, to a central axis of the first and second planar coils of the first antenna.

7. The system according to claim 1, wherein the system is configured for authenticating a product by an apparatus, wherein the reader is carried by the apparatus and the tag is carried by the product.

8. The system according to claim 7, wherein the product is mechanically linked to the apparatus.

9. The system according to claim 1, wherein the mechanical support is tubular in shape and wherein the first and second planar coils are mounted at an outer surface of the tubular mechanical support.

10. The system according to claim 9, wherein the tubular-shaped mechanical support is a cartridge.

11. The system according to claim 9, wherein the tubular-shaped mechanical support had an ovoid cross section.

12. An electronic cigarette, comprising a system of wireless communication, wherein:
a cartridge for use in the electronic cigarette includes a tag having a first antenna comprising:
a first planar coil;
a second planar coil;
wherein the first and second planar coils are electrically connected in series; and
a mechanical support for the first and second planar coils that disposes the first and second planar coils in a face-to-face relationship; and
wherein a body of the electronic cigarette includes a reader having a second antenna.

13. The electronic cigarette according to claim 12, wherein a mounting of the cartridge within the body mechanically fixes a coupling distance between the reader and the tag.

14. The electronic cigarette according to claim 12, wherein the second antenna is a planar coil.

15. The electronic cigarette according to claim 12, wherein the second antenna is a planar coil having a central axis perpendicular to a central axis of the first and second planar coils of the first antenna.

16. The electronic cigarette according to claim 12, wherein the second antenna has a central axis parallel, but not coaxial, to a central axis of the first and second planar coils of the first antenna.

17. The electronic cigarette according to claim 12, wherein each coil of the first and second planar coils of the first antenna is coplanar to a sheet of ferrite.

18. The electronic cigarette according to claim 12, wherein the system is configured for authenticating the cartridge for use with the electronic cigarette.

19. The electronic cigarette according to claim 12, wherein the mechanical support is tubular in shape and wherein the first and second planar coils are mounted at an outer surface of the tubular mechanical support.

20. A liquid cartridge insertable within for an electronic cigarette, comprising:
a tubular support configured to hold a liquid; and
an antenna mounted to said tubular support, wherein the antenna comprises:
a first planar coil;
a second planar coil;
wherein the first and second planar coils are electrically connected in series; and
wherein the mounted first and second planar coils are disposed in a face-to-face relationship; and
wherein the first and second planar coils are configured to support wireless communication between the liquid cartridge and the electronic cigarette when the liquid cartridge is inserted in the electronic cigarette.

21. The cartridge of claim 20, wherein the first and second planar coils are coaxial.

22. The cartridge of claim 20, wherein a distance separating the first and second planar coils is chosen to allow field lines to be propagated, between the first and second planar coils, in a direction parallel to the surface of the first and second planar coils.

23. The cartridge of claim 20, wherein external ends of the first and second planar coils are electrically coupled.

24. The cartridge of claim 20, wherein external ends of the first and second planar coils are directly electrically connected.

25. The cartridge of claim 20, wherein one coil of the first and second planar coils is interrupted in its internal winding to define two terminals of the antenna.

26. The cartridge of claim 20, wherein the electrical connection in series of the first and second planar coils is such that, when a current circulates from a center to a periphery of one coil, it circulates from a periphery to a center of the other coil.

* * * * *